US010089519B2

(12) United States Patent
Ohwa

(10) Patent No.: US 10,089,519 B2
(45) Date of Patent: Oct. 2, 2018

(54) IMAGE CAPTURING APPARATUS AND IMAGE PROCESSING METHOD

(71) Applicant: CANON KABUSHIKI KAISHA, Tokyo (JP)

(72) Inventor: Yasushi Ohwa, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 129 days.

(21) Appl. No.: 15/161,099

(22) Filed: May 20, 2016

(65) Prior Publication Data

US 2016/0350924 A1  Dec. 1, 2016

(30) Foreign Application Priority Data

May 25, 2015  (JP) ................................. 2015-105797

(51) Int. Cl.
| | |
|---|---|
| G06T 7/00 | (2017.01) |
| G06T 7/60 | (2017.01) |
| G06K 9/00 | (2006.01) |
| G06K 9/32 | (2006.01) |
| G06T 7/73 | (2017.01) |

(52) U.S. Cl.
CPC ....... *G06K 9/00261* (2013.01); *G06K 9/3241* (2013.01); *G06T 7/74* (2017.01); *G06T 2207/30201* (2013.01)

(58) Field of Classification Search
CPC .............. G06K 9/3241; G06K 9/00261; G06T 2207/30201; G06T 7/74
See application file for complete search history.

(56) References Cited

U.S. PATENT DOCUMENTS

| | | | | |
|---|---|---|---|---|
| 6,125,198 A | * | 9/2000 | Onda ..................... | G01C 11/06 382/154 |
| 2009/0231628 A1 | * | 9/2009 | Matsuhira .......... | G06K 9/00228 358/1.18 |
| 2012/0134586 A1 | * | 5/2012 | Pajaniradja ........ | G06K 9/00986 382/170 |

FOREIGN PATENT DOCUMENTS

| | | |
|---|---|---|
| JP | 7-322126 A | 12/1995 |
| JP | 2012-142865 A | 7/2012 |

* cited by examiner

*Primary Examiner* — Vincent Rudolph
*Assistant Examiner* — Pinalben Patel
(74) *Attorney, Agent, or Firm* — Canon U.S.A., Inc. IP Division

(57) ABSTRACT

An image processing apparatus includes a plurality of correlation processing units configured to perform correlation relating to search evaluation in parallel, a plurality of search frame processing units configured to clip from an input image a partial image to be input to the plurality of correlation processing units according to a designated processing frame, and a search frame determination unit configured to determine the arrangement of the processing frame in a vertical direction based on the number of correlation processing units and the size of the processing frame in the vertical direction. The arrangement of the processing frame in the vertical direction is determined such that the product of an interval between the processing frames in the vertical direction and the number of correlation processing units is equal to or larger than the size of the processing frame in the vertical direction.

8 Claims, 9 Drawing Sheets

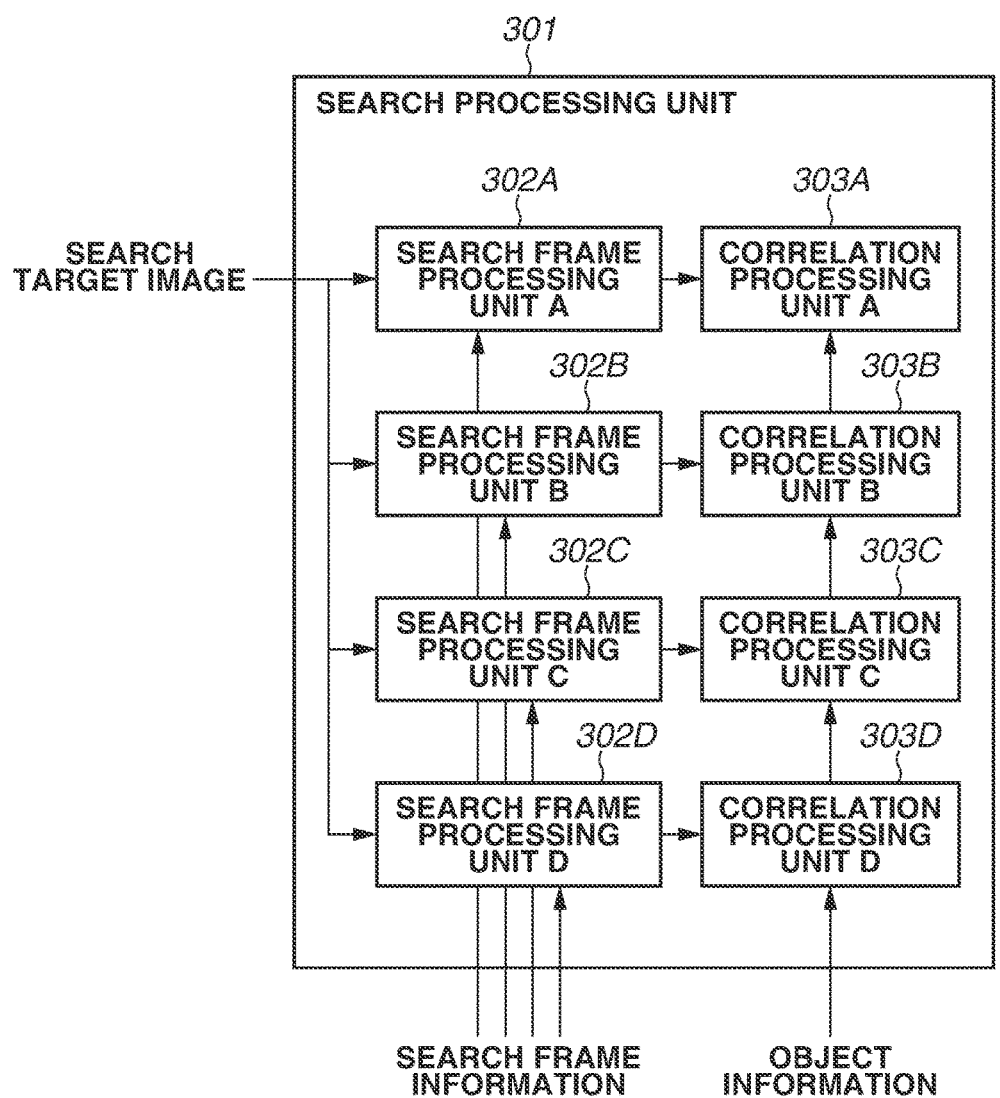

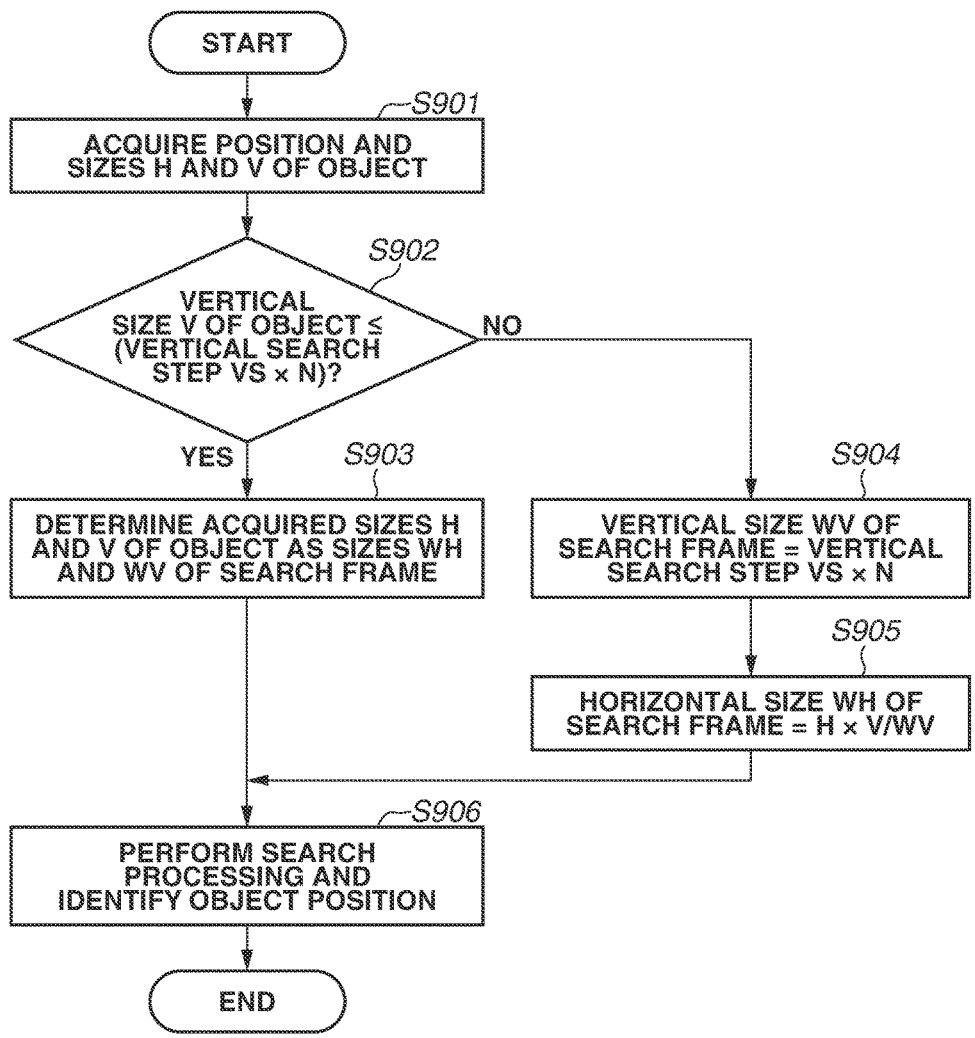

IMAGE CAPTURING APPARATUS AND IMAGE PROCESSING METHOD

BACKGROUND OF THE INVENTION

Field of the Disclosure

The present disclosure relates to image capturing, apparatuses and image processing methods.

Description of the Related Art

In image capturing performed by an image capturing apparatus such as a digital camera, object tracking processing is carried out to perform image capturing control such as auto-focusing. For example, Japanese Patent Application Laid-Open No. 7-322126 discusses, as a method of detecting motion vectors for object tracking, technologies for motion vector detection circuits configured to set a plurality of detection blocks to detect motion vectors of objects. Further, for example, Japanese Patent Application. Laid-Open No. 2012-142865 discusses technologies for efficiently accessing memory in motion detection between two frame images.

However, the conventional technologies discussed in Japanese Patent Application Laid-Open No. 7-322126 have a problem in the accuracy of detecting motion vectors because correlation processing is performed based on decimated pixel values of limited detection regions. Further, the conventional technologies discussed in Japanese Patent Application Laid-Open No. 2012-142865 have a problem in that the circuit size and costs increase because a secondary memory for temporarily storing a portion of frame images is needed to realize efficient memory access.

SUMMARY

According to an aspect of the present disclosure, an image processing apparatus configured to identify a region where a predetermined object is located within an image includes a reading unit configured to read a partial image of the first image as a second image, on each of a plurality of evaluation target regions set in a predetermined direction of a first image, an evaluation unit configured to perform in parallel on the plurality of the second images, a correlation evaluation with the image of the object, a determination unit configured to determine an interval (VS) between the plurality of evaluation target regions based on a number (N) of correlation evaluations performed in parallel by the evaluation unit and a size (WV) of the plurality of evaluation target regions in the predetermined direction, and an identification unit configured to identify a region where the predetermined object is located within the first image, based on a result of the correlation evaluation performed by the evaluation unit.

Further features of the present disclosure will become apparent from the following description of exemplary embodiments with reference to the attached drawings.

BRIEF DESCRIPTION OF THE DRAWINGS

FIG. 3 illustrates an example of the configuration of a search processing unit according to an exemplary embodiment of the present disclosure.

FIG. 9 is a flow chart illustrating an example of processing according to a third exemplary embodiment.

DESCRIPTION OF THE EMBODIMENTS

Various exemplary embodiments of the disclosure will be described below with reference to the drawings. In the following exemplary embodiments, application examples using a digital camera as an image capturing apparatus will be described.

The following describes a first exemplary embodiment of the present disclosure.

Figure 1:
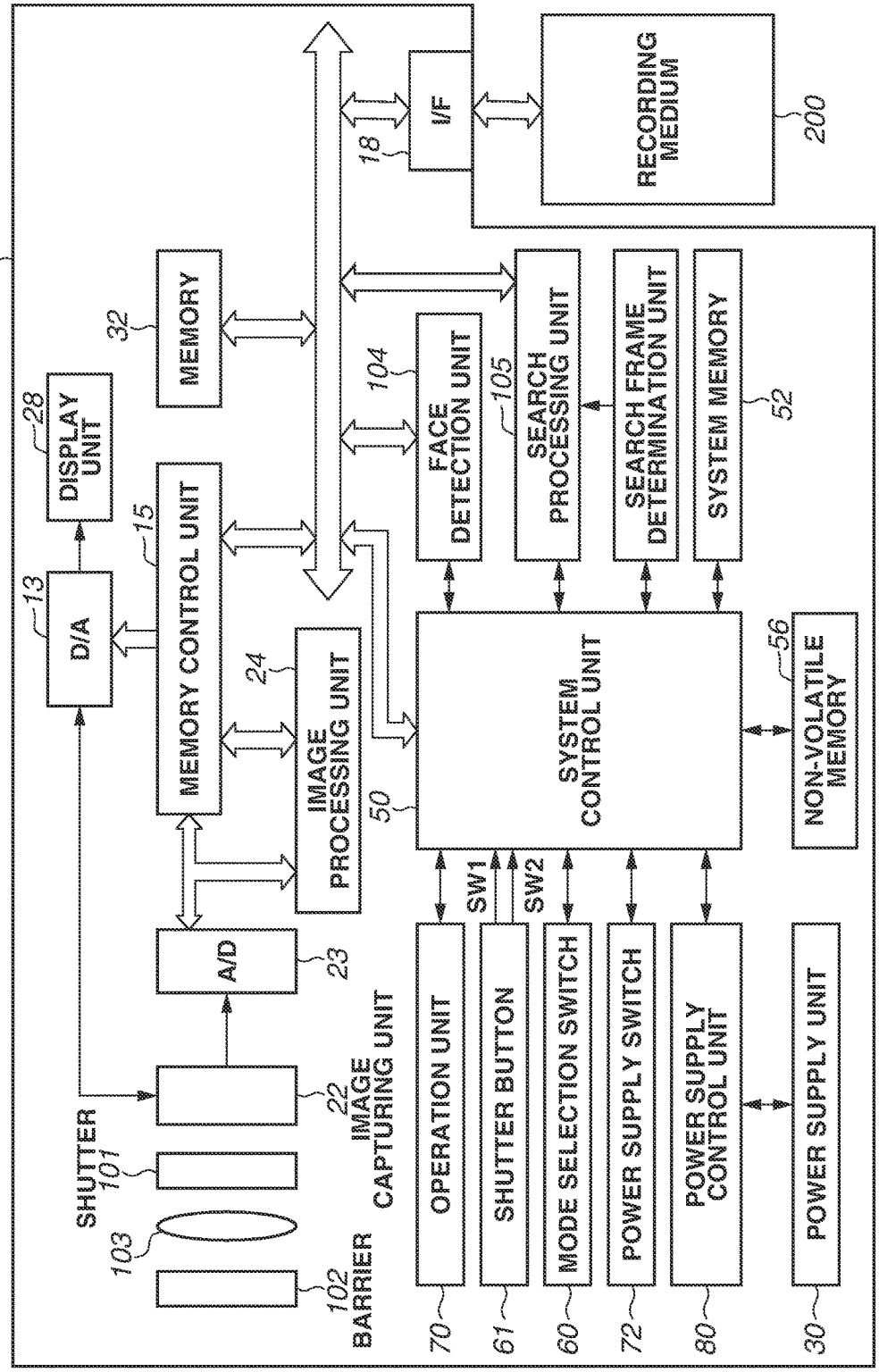
FIG. 1 illustrates an example of the configuration of an image capturing apparatus according to an exemplary embodiment of the present disclosure.

FIG. 1 is a block diagram illustrating an example of the configuration of a digital camera 100 as an image capturing apparatus according to the present exemplary embodiment. In FIG. 1, an imaging lens 103 is a lens including a focus lens. Further, a shutter 101 is a shutter having an aperture function, and an image capturing unit 22 is a unit including a charge-coupled device (CCD), and a complementary metal-oxide semiconductor (CMOS) device and configured to convert optical images into electrical signals. An analog/digital (A/D) converter 23 converts analog signals output from the image capturing unit 22 into digital signals. A barrier 102 prevents on an image capturing system including the imaging lens 103, the shutter 101, and the image capturing unit 22 from being contaminated and damaged.

An image processing unit 24 performs resizing, processing such as predetermined pixel interpolation and reduction and color conversion processing on data from the A/D converter 23 and data from a memory control unit 15. Further, predetermined calculation processing is performed in the image processing unit 24 using captured image data, and a system control unit 50 performs exposure control and ranging control based on obtained calculation results. In this way, through-the-lens (TTL) autofocus (AF) processing, automatic exposure (AE) processing, pre-flash (EF) processing, etc. are performed. Further, TTL automatic white balance (AWB) processing is also performed based on calculation results obtained by the image processing unit 24.

Output data from the A/D converter 23 is, written to a memory 32 via the image processing unit 24 and the memory control unit 15 or via the memory control unit 15. The memory 32 stores image data captured by the image capturing unit 22 and converted into digital data by the A/D converter 23 as well as image data to be displayed on a display unit 28. A digital/analog (D/A) converter 13 converts the display data stored in the memory 32 into analog signals. The display unit 28 performs display on a display device such as a liquid crystal device (LCD) according to analog signals from the D/A converter 13. In this way, the image data for display written to the memory 32 is displayed by the display unit 28.

A non-volatile memory 56 is a memory that is electrically erasable and programmable. The non-volatile memory 56 is, for example, an electrically erasable programmable read-only memory (EEPROM). The non-volatile memory 56 stores constants, programs, etc. for the operation of the system control unit 50. The term "program" used herein refers to, for example, a program for executing processing specified in various flow charts according to an exemplary embodiment of the present disclosure that will be described below.

The system control unit 50 controls the entire digital camera 100. The system control unit 50 realizes processing according to the present exemplary embodiment by, for example, executing a program recorded in the non-volatile memory 56. Further, the system control unit 50 also performs display control by controlling the memory 32, the D/A converter 13, the display unit 28, etc. A system memory 52 is, for example, a random access memory (RAM). Constants, variables, programs, etc that are read from the non-volatile memory 56 for the operation of the system control unit 50 are loaded into the system memory 52.

A shutter button 61 is an operation unit for giving an instruction to capture an Image. In the middle of operating the shutter button 61, i.e., when the shutter button 61 is half-pressed (an instruction for preparation for image capturing is given), a shutter switch signal SW1 is output. In response to the output of the shutter switch signal SW1, operations of AF processing, AS processing, AWS processing, EF processing, etc. are started. Further, when the operation of the shutter button 61 is completed, i.e., when the shutter button 61 is fully pressed (an instruction for image capturing is given), a shutter switch signal SW2 is output. In response to the output of the shutter switch signal SW2, the system control unit 50 starts a series of operations of image capturing processing from the reading of signals from the image capturing unit 22, to the writing of image data to a recording medium 200.

A mode selection switch 60 selects an operation mode of the system control unit 50 from among a still image recording mode, a moving image recording mode, a reproduction mode, etc. An operation unit 70 inputs various types of operation instructions to the system control unit 50. Appropriate functions are allocated to respective operation members of the operation unit 70 as for each case by selecting and operating various types of function icons displayed on the display unit 28, so that the respective operation members function as various types of function buttons. Further, a touch panel may be provided on the display unit 28 so that the user can operate the operation unit 70 via virtual operation members displayed on the screen by touching the display panel.

A power supply control unit 80 detects the presence/absence of an attached battery, battery type, remaining battery level, etc. The power supply control unit 80 supplies necessary voltage to the respective units including the recording medium 200 for a necessary period of time based on the detection results and an instruction from the system control unit 50. A power supply unit 30 supplies power to the digital camera 100. An interface unit 18 is an interface between the digital camera 100 and the recording medium 200 which includes a semiconductor memory, and a magnetic disk. A power supply switch 72 is for turning on/off the power supply.

A face detection unit 104 performs detection of face information about an object, on data from the memory 32. The digital camera 100 enables image capturing using one-central-point AF, in which AF control is performed on a single point at a central position within an image capturing screen, or face AF, in which AF control is performed on a face within the image capturing screen that is detected by the face detection function.

The following describes the face detection function performed by the face detection unit 104. The following processing for the face detection is executed by the face detection unit 104 under the control of the system control unit 50. The face detection unit 104 apples a horizontal band pass filter to image data and then applies a vertical band pass filter to the processed image data. Edge components are detected from the image data by the horizontal and vertical band pass filters. Then, the face detection unit 104 performs pattern matching on the detected edge components to extract candidates for eyes, nose, mouth, and ears.

Then, the face detection unit 104 determines a pair of eyes that satisfy preset conditions (e.g., distance between two eyes, gradient, etc.) from among the extracted eye candidates, and narrows the eye candidates to those that can be paired. The face detection unit 104 associates the narrowed eye candidates with other parts (nose, mouth, ears) of the corresponding face and, further, passes them through a preset non-face condition filter to detect the face. The face detection unit 104 outputs face information based on the face detection results and then ends the processing. At this time, the face information is stored in the system memory 52. Examples of detected face information include the size, position, and gradient of the face, positional information about organ portions such as eves, mouth, etc.

A search processing unit 105 performs search evaluation processing on captured images. The search processing unit 105 performs correlation processing on each region of image data of the object stored in the memory 32 and image data of a current frame while changing a region to be compared for each region. The search processing unit 105 calculates a correlation value between the image data of the object as a search target and stored in the memory 32, and the image data or the current frame according to, for example, the following formula (1):

$$D=\Sigma_{i=0}^{M}(|Yi-Yti|+|Ui-Uti|+|Vi-Vti|) \qquad (1)$$

In this formula, Yi, Ui, and Vi (i=0 to M) are pixel values within a region of the current frame, and Yti, Uti, and Vti are pixel values of a target image to be compared. The target image is image data of an object to be tracked and is stored in advance in the memory 32. The image data of the object may be image data generated by clipping a region designated by the user using an image displayed on the display unit 28 and the operation unit 70, or may be image data generated by clipping a face region acquired based on the face information detected by the face detection unit 104. The value of formula (1) becomes smaller as a correlation becomes higher.

While the correlation value is calculated using formula (1) in the present exemplary embodiment, a method of calculating a correlation between the stored object image data and the current frame image data is not limited to the method described above. For example, the correlation may be calculated based on a histogram of a region or may be calculated based on the state of similarity between feature points with respect to a data form.

Further, the search processing unit 105 performs the processing while moving the position of a target region for each search step within one piece of the image data which undergoes the correlation processing, i.e., while shifting a comparison target region at intervals of the search step. This will be described in detail below.

A search frame determination unit 106 determines a processing frame (hereinafter, "search frame") that specifies a target region of the image data on which the search processing unit 105 performs search evaluation processing (correlation processing). When the correlation processing performed in the search processing unit 105, the search frame determination unit 106 determines a size (horizontal size) WH in a horizontal direction of the search frame and a size (vertical size) WV in a vertical direction of the search frame. Further, the search frame determination unit 106 determines intervals of a horizontal search step HS and a vertical search step VS at which a target region undergoing the correlation processing is moved in the horizontal and vertical directions.

Figure 2A:
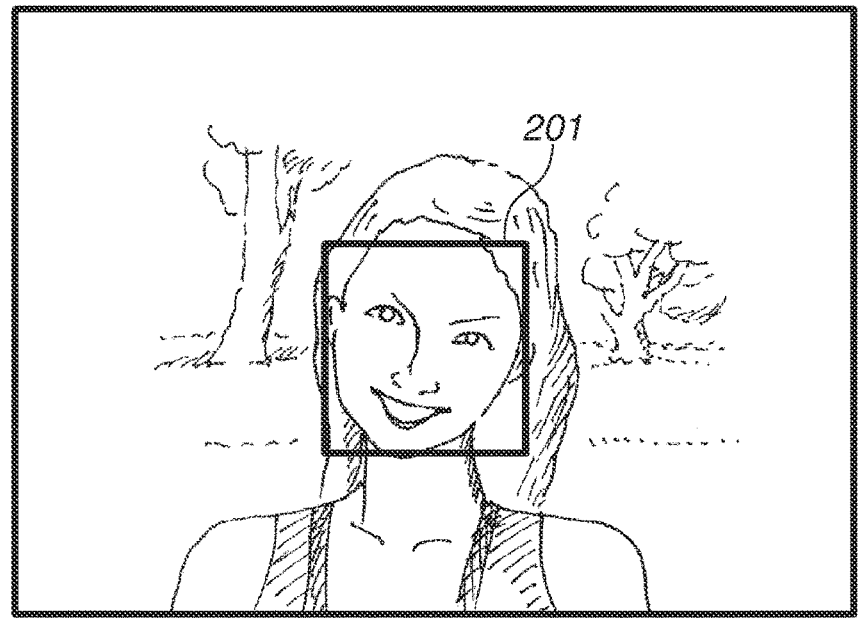
FIGS. 2A and 2B each illustrate an object display frame according to an exemplary embodiment of the present disclosure.
Figure 2B:
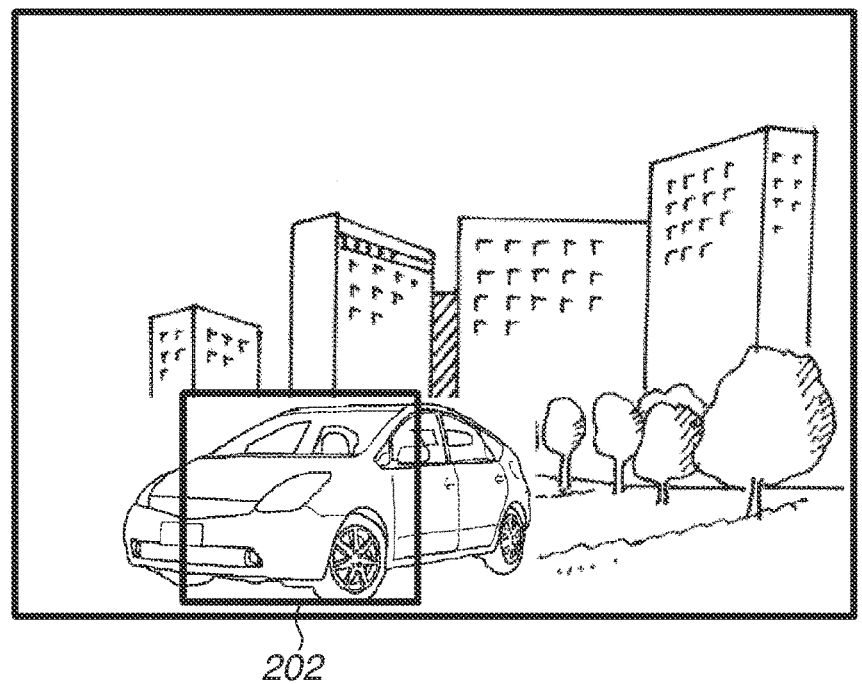

The following describes an object display frame indicated on the digital camera 100 with reference to FIGS. 2A and 2B. FIGS. 2A. and 2B each illustrate an example of the display frame indicated together with a live image and an object on the display unit 28. FIG. 2A illustrates an example of an image displayed in a case where the object is a person. In FIG. 2A, a display frame 201 is indicated in the position of the face of the person. In an initial state, the display frame 201 can be indicated as illustrated in FIG. 1A based on the face position, face size, etc. that are the face information detected by the face detection unit 104.

FIG. 2B illustrates an example of an image displayed in a case where the object is not a person. In FIG. 2B, a display frame 202 is arranged and indicated on the object as a car. In the case where the object is not a person, for example, the user can designate the position of the object by operating a touch panel of the operation unit 70 while observing the image displayed on the display unit 28. Thus, the display frame 202 may be indicated by the user on the display unit 28 in the initial state according to the object position designated by the user.

FIG. 3 is a block diagram illustrating an example of the configuration of the search processing unit 105 according to the present exemplary embodiment. A search processing unit 301 illustrated in FIG. 3 includes search frame processing units 302A, 302B, 302C, and 302D and correlation processing units 303A, 303B, 303C, and 303D. The search frame processing units 302A to 302D clip the image data within a search frame region from an input search target image based on search frame information. In other words, the search frame processing units 302A to 302D select the image data of a portion corresponding to the search frame region specified by the search frame information from the input search target image and clip the selected image data as a partial image.

The correlation processing units 303A to 303D perform correlation value processing to calculate a correlation value between the image data on the partial image clipped by the respective search frame processing units 302A to 302D and the object image data. Different search frame positions and sizes can be designated for the search frame processing units 302A to 302D with respect to input images, and the search frame determination unit 106 designates particular search frame positions and sizes using the search frame information.

As described above, the search processing unit 105 according to the present exemplary embodiment includes the plurality of correlation processing units 303A to 303D arranged in parallel and the search frame processing units 302A to 302D corresponding to the correlation processing units 303A to 303D. In this way, the search processing unit 105 according to the present exemplary embodiment can perform in parallel the search evaluation processing including the clipping of a partial image corresponding to a search frame region from the input search target image and the correlation processing on the clipped partial image and an object image. While FIG. 3 illustrates the example in which four pairs of search frame processing units and correlation processing units are included, the number of search frame processing units and correlation processing units is not limited to four and may be any number.

The following describes the search processing performed by the search processing unit 105, with reference to FIGS. 4A to 4H and 5A to 5F. FIGS. 4A to 4H illustrate vertical search processing according to the present exemplary embodiment, showing an example of vertical search processing in the leftmost vertical search region.

An image 401 is an entire search target image, about which a correlation value between the image 401 and the object image is obtained in the search processing. A vertical search processing region 402 is a region for the search processing in the vertical direction in a single vertical search region. The vertical search processing region 402 is illustrated in FIGS. 4A to 4H as an example in the case where the vertical search processing region 402 is the leftmost region of the image 401. The width of the vertical search processing region 402 is the width WH of the search frame (horizontal size of the search frame) regardless of the search position in the horizontal direction.

An order 403 indicates an order of reading and scanning image data in the processing region 402 of the image 401 in the vertical search processing in the search processing according to the present exemplary embodiment, the reading and scanning are performed from the upper left to the lower left in the region 402. Search frames 404 to 411 each have a horizontal size WE and a vertical size WV.

The search frames 404 to 411 are moved in the vertical direction by the vertical search step VS (412 to 418), whereby the correlation processing is performed while the processing target region is moved in the vertical direction.

Figure 4A:
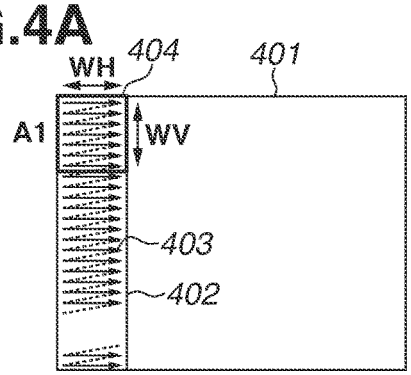
FIGS. 4A to 4H illustrate vertical search processing according to an exemplary embodiment of the present disclosure.
Figure 4B:
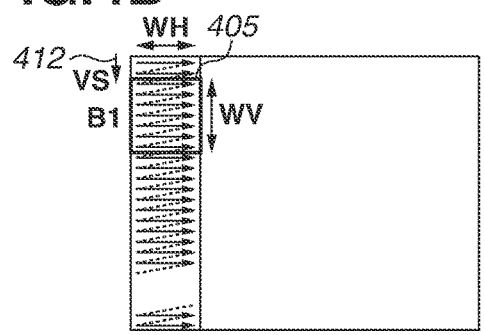

In FIG. 4A, to compare the uppermost and leftmost region of the search target image with the target image (object image), a search frame A1 (404) is arranged as illustrated, and the search frame processing unit A (302A) performs image clipping and the correlation processing unit A (303A) performs correlation processing. In FIG. 4B, a search frame B1 (405) is arranged in a position moved downward from the search frame A1 (404) by the vertical search step VS (412), and the search frame processing unit B (302B) performs image clipping and the correlation processing unit B (303C) performs correlation processing.

Figure 4C:
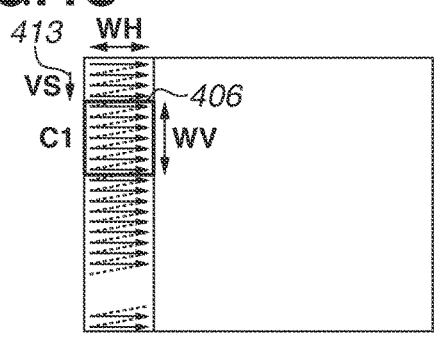
Figure 4D:
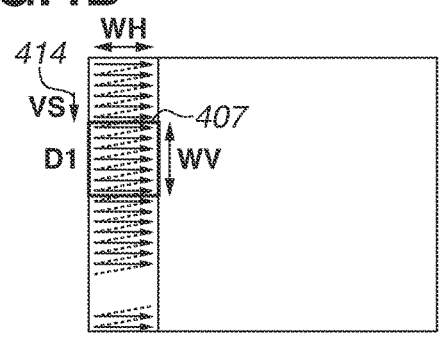

In FIG. 4C, a search frame C1 (406) is arranged in a position moved downward from the search frame B1 (405) by the vertical search step VS (413), and the search frame processing unit C (302C) performs image clipping and the correlation processing unit C (303C) performs correlation processing. In FIG. 4D, a search frame D1 (407) is arranged in a position moved downward from the search frame C1 (406) by the vertical search step VS (414), and the search frame processing unit B (302D) performs image clipping and the correlation processing unit B (303D) performs correlation processing.

Figure 4E:
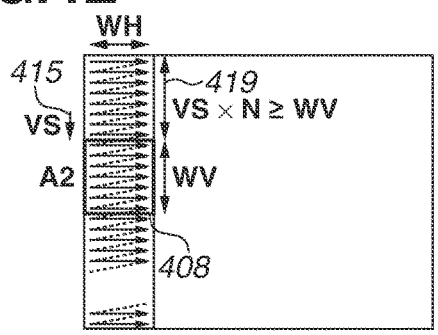
Figure 4F:
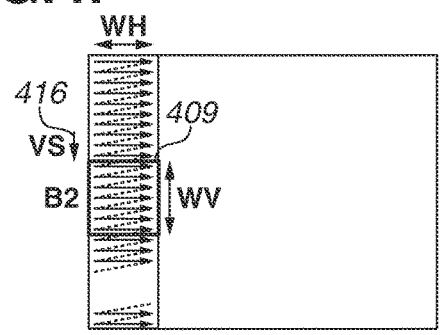

In FIG. 4E, a search frame A2 (408) is arranged in a position moved downward from the search frame D1 (407) by the vertical search step VS (415), and the search frame processing unit A (302A) performs image clipping and the correlation processing unit A (303A) performs correlation processing. In FIG. 4F, a search frame B2 (409) is arranged in a position moved downward from the search frame A2 (408) by the vertical search step VS (416), and the search frame processing unit B (302B) performs image clipping and the correlation processing unit B (303B) performs correlation processing.

Figure 4G:
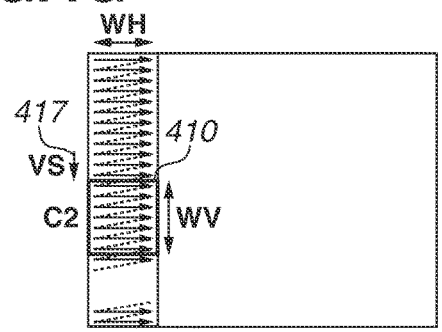
Figure 4H:
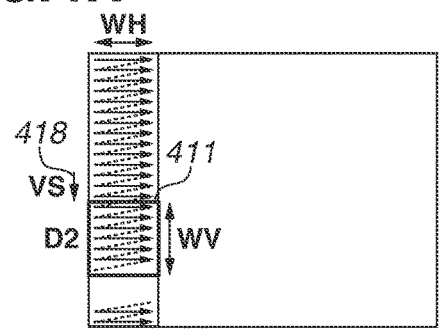

In FIG. 4G, a search frame C2 (410) is arranged in a position moved downward from the search frame B2 (409) by the vertical search step VS (417), and the search frame processing unit C (302C) performs image clipping and the correlation processing unit C (303C) performs correlation processing. In FIG. 4H, a search frame D2 (411) is arranged in a position moved downward from the search frame C2 (410) by the vertical search step VS (418), and the search frame processing unit D (302D) performs image clipping and the correlation processing unit D (303D) performs correlation processing. Thus, while the processing is repeated in the vertical direction, the correlation processing is repeated up to the lower end of the vertical search processing region 402.

In order to efficiently repeat the processing using four parallel circuits again and again in the search processing unit 105 capable of performing four-parallel processing as illustrated in FIG. 3, a space 419 between the search frame arrange positions needs to satisfy the conditional expression (VS×N)≥WV as illustrated in FIG. 4E. Specifically, a space between the search frame arrange positions corresponding to a circuit, a space between the positions in which the search frames A1 (404) and A2 (408) are respectively arranged, needs to satisfy the conditional expression (VS×N)≥WV. In the conditional expression, VS is a vertical search step, N is the number of parallel circuits in the search processing, and WV is the vertical size of a search frame. In the example of the search processing unit 105 according to the present exemplary embodiment, the number of parallel circuits is 4, i.e., N=4.

The conditional expression (VS×N)≥WV described above also needs to be satisfied between the search frames B1 (405) and B2 (409), between the search. frames C1 (406) and C2 (410), and between the search frames D1 (407) and D2 (411). Further, the same condition also needs to be satisfied between search frames that are rearranged while the processing is repeatedly performed. Although the number of processing circuits that can be operated in parallel in the search processing unit 105 is four according to the present exemplary embodiment, even in a case where the number of parallel circuits is N other than four, the same condition still needs to be satisfied.

Figure 5A:
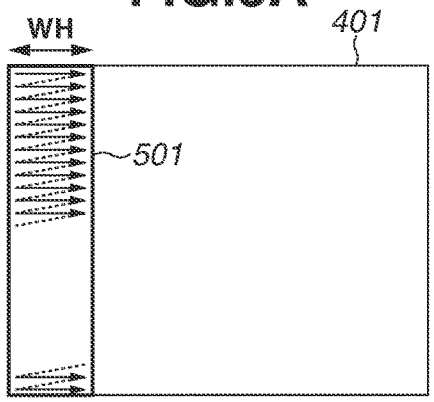
FIGS. 5A to 5F illustrate horizontal search processing according to an exemplary embodiment of the present disclosure.

FIGS. 5A to 5F illustrate horizontal search processing according to the present exemplary embodiment. FIG. 5A shows that the entire vertical search processing illustrated in FIGS. 4A to 4H is performed in image data reading and scanning 501 illustrated in FIG. 5A. FIGS. 5B to 5F illustrate that vertical search processing similar to the foregoing is performed while a search region is moved in the horizontal direction for each horizontal search step HS (507 to 511).

Figure 5B:
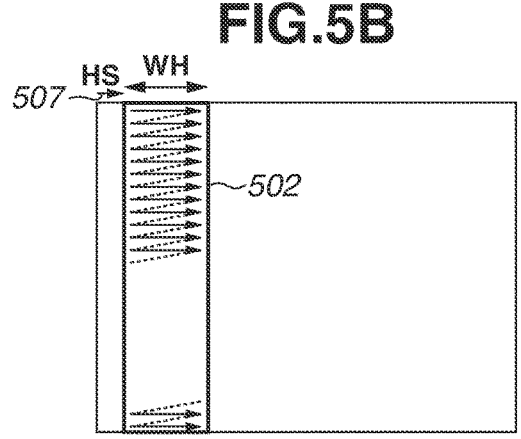
Figure 5C:
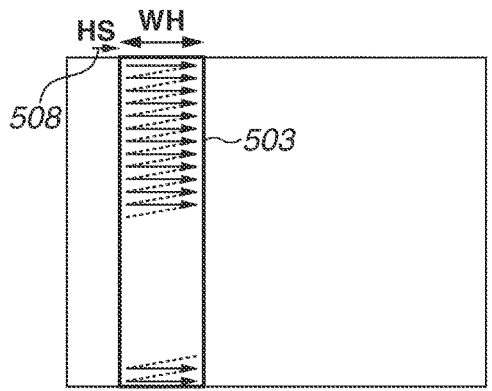

FIG. 5B shows that a region located rightward by a horizontal search step HS (507) from the region of the image data reading and scanning 501 illustrated in FIG. 5A is read and scanned to perform vertical search processing in image data reading and scanning 502 illustrated in FIG. 5B. FIG. 5C shows that a region located rightward by a horizontal search step HS (508) from the region of the image data reading and scanning 502 illustrated in FIG. 5B is read and scanned to perform vertical search processing in image data reading and scanning 503 illustrated in FIG. 5C.

Figure 5D:
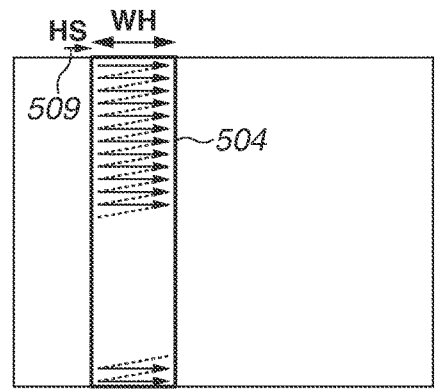
Figure 5E:
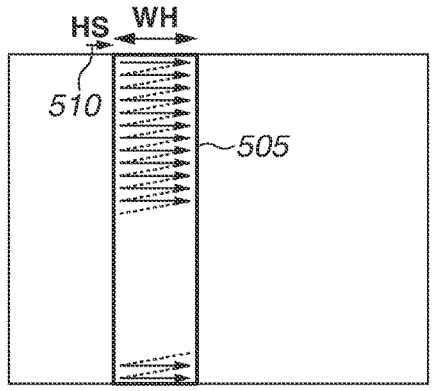

FIG. 5D shows that a region located rightward by a horizontal search step HS (509) from the region of the image data reading and scanning 503 illustrated in FIG. 5C is read and scanned to perform vertical search processing in image data reading and scanning 504 illustrated in FIG. 5D. FIG. 5E illustrates that a region located rightward by a horizontal search step HS (510) from the region of the image data reading and scanning 504 illustrated in FIG. 5D is read and scanned to perform vertical search processing in image data reading and scanning 505 illustrated in FIG. 5E.

Figure 5F:
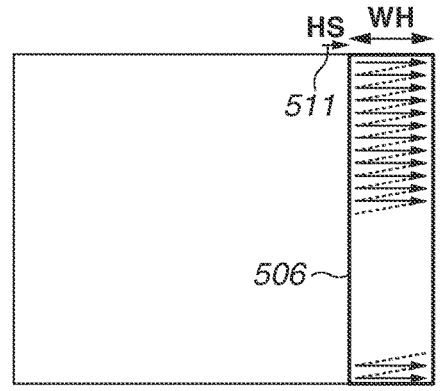

As the foregoing describes, the vertical search processing is repeatedly performed while a region on which the vertical search processing is performed is moved in the horizontal direction, and the processing is performed until the rightmost region of the image 401 being the search processing target is read and scanned to perform the vertical search processing as illustrated by image data reading and scanning 506 in FIG. 5F.

Figure 6:
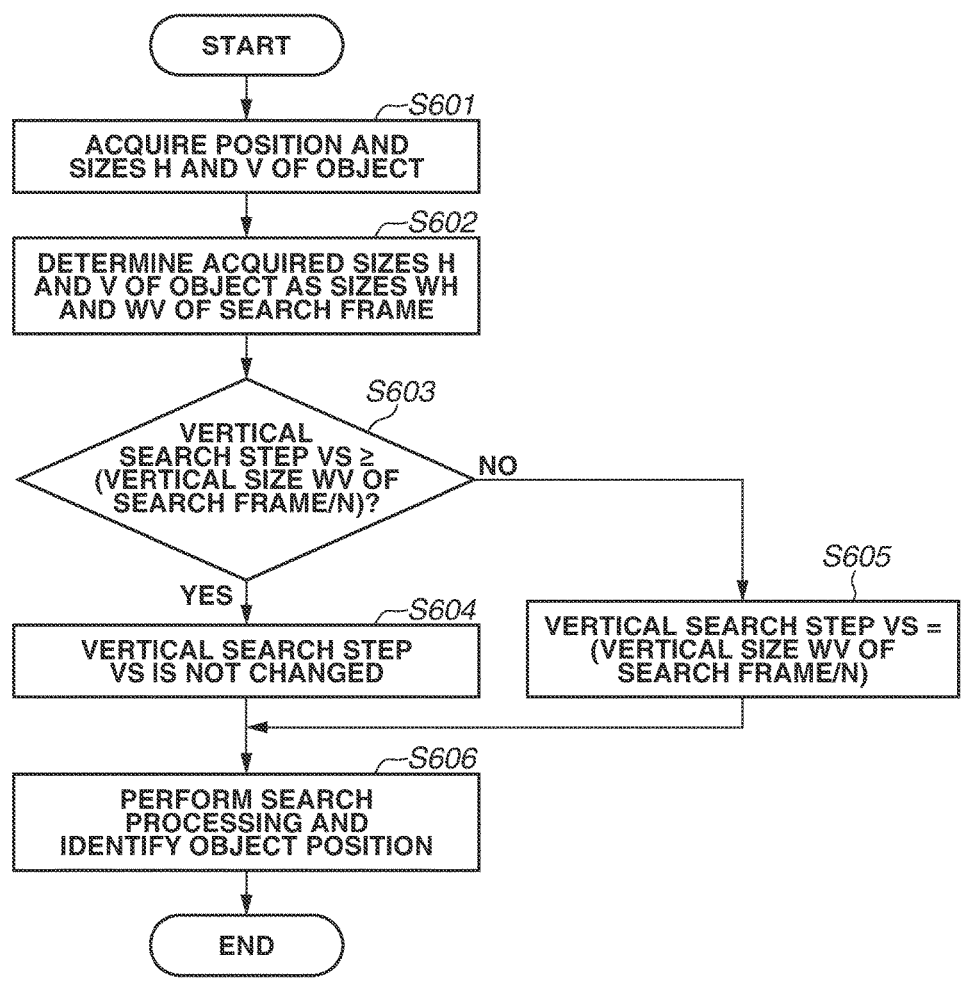
FIG. 6 is a flow chart illustrating an example of processing according to a first exemplary embodiment.

FIG. 6 is a flow chart illustrating an example of processing performed in the search frame determination unit 106 and the search processing unit 105 according to the present exemplary embodiment. In step S601, the search frame determination unit 106 acquires the position, the horizontal size H, and the vertical size V of an object. In a case where the object is a person and the face is detected by the face detection unit 104, information about the position, the horizontal size H, and the vertical size V of the object may be acquired from the detected face information. In a case where the object is not a person, the information about the position, the horizontal size H, and the vertical size V of the object may be acquired from, for example, object information based on user designation via the operation unit 70 and the touch panel of the display unit 28.

In step S602, the search frame determination unit 106 determines as a horizontal size WE and a vertical size WV of a search frame the horizontal size H and the vertical size V of the object that are acquired in step S601. In step S603, the search frame determination unit. 106 determines whether the vertical size WV (=V) of the search frame that is determined in step S602 satisfies the formula VS≥(WV/N). In the formula, VS is a vertical search step, WV is the vertical size of the search frame, and N is the number of parallel circuits used in the search processing unit 105. In other words, the search frame determination unit 106 determines whether the product of the vertical search step and the number parallel circuits used in the search processing unit 105 is equal to or larger than the vertical size of the search frame. In the first exemplary embodiment, the initial vertical search step VS as well as the horizontal search step HS are predetermined based on the processing time for the identification of the position of the object in a current frame, the accuracy o f the object position, etc.

If the vertical size WV (=V) of the search frame that determined in step S602 satisfies the formula VS≥(WV/N) (YES in step S603), the processing proceeds to step S604. In step S604, the search frame determination unit 106 does not change the predetermined vertical search step VS, and the processing proceeds to next step S606.

On the other hand, if the vertical WV (=V) of the search frame determined in step S602 does not satisfy the formula VS≥(WV/N) (NO in step S603), the processing proceeds to step S605. In step S605, the search frame determination unit 106 changes the vertical search step VS based on the vertical size WV of the search frame determined in step S602 and the number N of parallel circuits used in the search processing unit 105. The search frame determination unit 106 changes the vertical search step VS to a value calculated from the formula VS≥(WV/N) based on the vertical size WV of the search frame and the number N of parallel circuits of the search processing unit 105, and the processing proceeds to next step S606.

In step S606, the search processing unit 105 performs search processing according to the horizontal size WH and the vertical size WV of the search frame determined by the search frame determination unit 106, the horizontal search step HS, and the vertical search step VS, and identifies the object position. In the search processing, a partial image is clipped from a search target image according to a designated search frame, and correlation processing is performed on the clipped partial image and the object image while a region to be compared is changed as described above with reference to FIGS. 4A to 4H and 5A to 5F.

According to the first exemplary embodiment, if the product of the vertical search step and the number of parallel circuits of the search processing unit is not equal to or larger than the vertical size of the search frame, the vertical search step is changed to a value obtained by dividing the vertical size of the search frame by the number of parallel circuits of the search processing unit. In this way, the product of the vertical search step and the number of parallel circuits of the search processing unit becomes equal to or larger than the vertical size of the search frame. Accordingly, double reading of search target image data and an extra memory for temporarily storing search target image data are not necessary, and an image capturing apparatus can be provided that can realize search evaluation processing having an efficient object tracking function while an increase in circuit size and costs is restrained.

While the foregoing describes the arrangement in which the search processing unit includes a plurality of search processing frame circuits and the respective search processing frame circuits individually perform evaluation processing to execute parallel processing, a single search processing frame circuit may perform evaluation processing in parallel. In this case, the search frame determination unit may change the vertical search step VS to a value obtained from the formula VS=(WV/N) based on the vertical size WV of the search frame and the number N of parallel evaluations performed in the search processing unit.

The following describes a second exemplary embodiment of the present disclosure. The configuration of a digital camera is an example of an image capturing apparatus according to the second exemplary embodiment. The configuration of the digital camera according to the second exemplary embodiment is similar to the digital camera described above in the first exemplary embodiment with reference to FIGS. 1, 1A, 2B, and 3. Further, operations of the search processing unit 105 are similar to the operations in the search processing described above with reference to FIGS. 4A to 4H and 5A to 5F.

Figure 7:
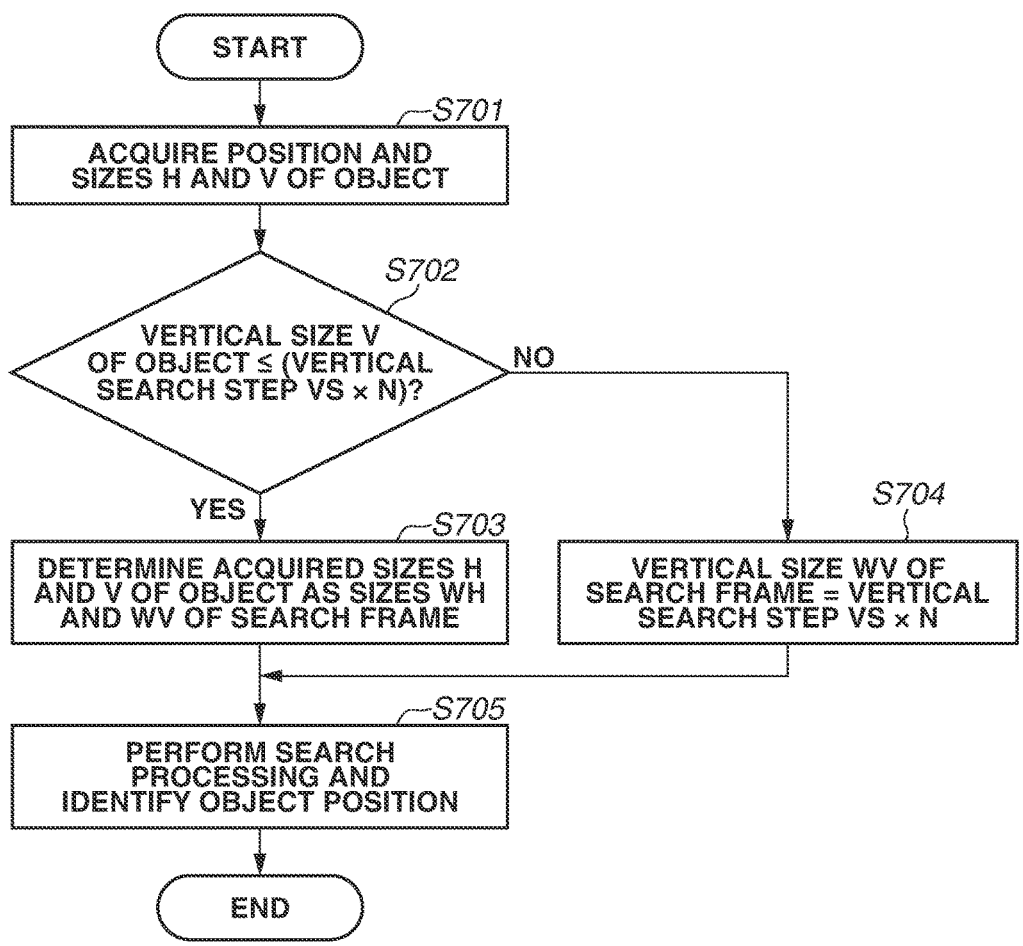
FIG. 7 is a flow chart illustrating an example of processing according to a second exemplary embodiment.

FIG. 7 is a flow chart illustrating an example of processing performed in the search frame determination unit 106 and the search processing unit 105 according to the second exemplary embodiment. In step S701, the search frame determination unit 106 acquires the position, the horizontal size H, and the vertical size V of an object, similar to step S601 in the first exemplary embodiment.

In step S702, the search frame determination unit 106 determines whether the vertical size V of the object that is acquired in step S701 satisfies the formula V≤(NS×N). In the formula, V is the vertical size of the object, VS is the vertical search step, and N is the number of parallel circuits used in the search processing unit 105. Specifically, as in the first exemplary embodiment, the search frame determination unit 106 determines whether the product of the vertical search step and the number of parallel circuits of the search processing unit 105 is equal to or larger than the vertical size of the search frame. In the second exemplary embodiment, the vertical search step VS as well as the horizontal search step HS are predetermined based on the processing time for the identification of the position of the object in a current frame, the accuracy of the object position, etc.

If the vertical size V of the object satisfies the formula V≥(VS×N) (YES in step S702), the processing proceeds to step S703. In step S703, the search frame determination unit 106 determines the horizontal size and the vertical size V of the object that are acquired in step S701 as the horizontal size WH and the vertical size WV of the search frame, and the processing proceeds to step S705.

On the other hand, if the vertical size V of the object does not satisfy the formula V≥(VS×N) (NO in step S702), the processing proceeds to step S704. In step S704, the search frame determination unit 106 determines a value calculated from the formula WV=(VS×N) based on the vertical search step VS and the number N of parallel circuits used in the search processing unit 105 as the vertical size WV of the frame, and the processing proceeds to step S705. Also in step S704, the search frame determination unit 106 determines the horizontal size H of the object that is acquired in step S701 as the horizontal size WH of the search frame.

In step S705, the search processing unit 105 performs search processing according to the horizontal size WH and the vertical size WV of the search frame that are determined by the search frame determination unit 106, the horizontal search step HS, and the vertical search step VS, and acquires the object position. In the search processing, a partial image is clipped from a search target image according to a designated search frame, and correlation processing is performed on the clipped partial image and the object image while a region to be compared is changed as described above with reference to FIGS. 4A to 4H and 5A to 5F.

Figure 8:
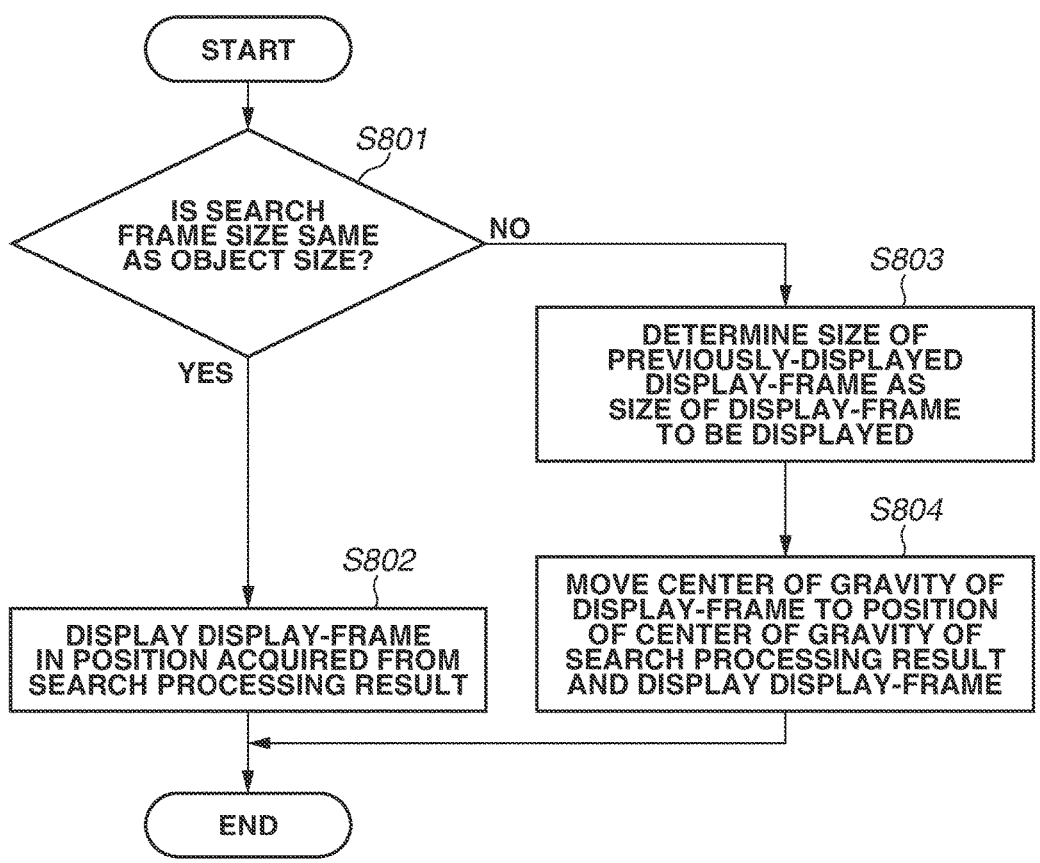
FIG. 8 is a flow chart illustrating an example of processing for displaying a display frame according to the second exemplary embodiment.

The following describes display frame display processing according to the second exemplary embodiment. FIG. 8 is a flow chart illustrating an example of display frame display processing according to the second exemplary embodiment. The initial size and position of a display frame indicating the object position are determined based on the face detection results or user designation as described above with reference to FIGS. 2A and 2B. Then, the display position of the display frame indicating the region where the object is located is moved according to the search processing result following the object during the display of consecutive frame images such as the display of a live view or moving images.

In step S801, it is determined by the search frame determination unit 106 whether the search frame size is the same as the object size. If the search frame size is the same as the object size (YES in step S801), the processing proceeds to step S802. In step S802, the position and size of the search frame having the highest correlation with the object acquired from the search processing result are determined as the position and size of the display frame to be displayed together with the display image, and the display frame is displayed on the display unit 28. The higher the correlation, the smaller the value calculated from formula (1) described above, so that if the correlation value is used directly as the evaluation value, the position and size of the search frame that has the smallest evaluation value are selected as the position and size of the display frame. On the contrary, if the reciprocal of the correlation value is used as the evaluation value, the position and size of the search frame that has the largest evaluation value are selected as the position and size of the display frame.

On the other hand, if the search frame size is not the same as the object size (NO in step S801), the processing proceeds to step S803. In step S803, the size of the previouslydisplayed display frame is determined as the size of the display frame to be displayed together with the displayed image. Further, in step S804, the position of the center of gravity of the search frame is calculated from position and size of the search frame having the highest correlation with the object acquired from the search processing result, and the display frame is displayed on the display unit 28 by moving the position of the center of gravity of the display frame to the calculated center of gravity of the search frame.

While the foregoing describes the example in which the position of the display frame is determined based on the search processing result, if there are a new face detection result, new user designation, etc., the size and position of the display frame may be determined according to the new face detection result, the new user designation.

According to the second exemplary embodiment, if the product of the vertical search step and the number of parallel circuits of the search processing unit is smaller than the vertical size of the search frame, the vertical size of the search frame is changed to the product of the vertical search step and the number of parallel circuits of the search processing unit. In this way, the product of the vertical search step and the number of parallel circuits of the search processing unit becomes equal to or larger than the vertical size of the search frame. Accordingly, double reading of search target image data and an extra memory for temporarily storing search target image data are not needed, and an image capturing apparatus can be provided that can realize search evaluation processing having an efficient object tracking function, etc. while an increase in circuit size and costs is restrained.

The following describes a third exemplary embodiment of the present disclosure. The configuration of a digital camera that is an example of an image capturing apparatus according to the third exemplary embodiment is similar to the configuration of the digital camera described above in the first exemplary embodiment with reference to FIGS. 1, 1A, 2B, and 3. Further, operations of the search processing unit 105 are similar to the operations in the search processing described above with reference to FIGS. 4A to 4H and 5A to 5F.

FIG. 9 is a flow chart illustrating an example of processing performed in the search frame determination unit 106 and the search processing unit 105 according to the third exemplary embodiment. In step S901, the search frame determination unit 106 acquires the position, the horizontal size H, and the vertical size V of an object, as in step S601 in the first exemplary embodiment.

In step S902, the search frame determination unit 106 determines whether the vertical size V of the object acquired in step S901 satisfies the formula V≥(VS×N). In the formula, V is the vertical size of the object, VS is the vertical search step, and N is the number of parallel circuits used in the search processing unit 105. In the third exemplary embodiment, the vertical search step VS as well as the horizontal search step HS are predetermined based on the processing time for the calculation of the position of the object in a current frame, the accuracy of the object position, etc.

If the vertical size V of the object satisfies the formula V≥(VS×N) (YES in step S902), the processing proceeds to step S903. In step S903, the search frame determination unit 106 determines the horizontal size H and the vertical size V of the object that are acquired in step S901 as the horizontal size NH and the vertical size WV of the search frame, and the processing proceeds to step S906.

On the other hand, if the vertical size V of the object does not satisfy the formula V≥(VS×N) (NO in step S902), the processing proceeds to step S904. In step S904, the search frame determination unit 106 determines as the vertical size WV of the search frame a value calculated from the formula WV=(VS×N) based on the vertical search step VS and the number N of parallel circuits used in the search processing unit 105, and the processing proceeds to step S905. In next step S905, the search frame determination unit 106 determines as the horizontal size WH of the search frame a value calculated from the formula WH=(H×V/WV) based on the horizontal size H and the vertical size V of the object and the vertical size WV of the search frame, and the processing proceeds to step S906. While the foregoing describes as an example the calculation method using the formula described above, the calculation method is not limited to the described method.

In step S906, the search processing unit 105 performs search processing according to the horizontal size NH and the vertical size WV of the search frame that are determined by the search frame determination unit 106, the horizontal search step HS, and the vertical search step VS, and acquires the object position. In the search processing, a partial image is clipped from a search target image according to a designated search frame, and correlation processing is performed on the clipped partial image and the object image while a region to be compared is changed as described above with reference to FIGS. 4A to 4H and 5A to 5F.

As in the second exemplary embodiment, the display position of the display frame indicating the region where the object is located is moved according to the search processing result following the object during the display of consecutive frame images such as the display of a live view or moving images. The processing relating to the size and position of the display frame is also similar to the processing in the second exemplary embodiment, and processing similar to the flow chart illustrated in FIG. 8 described above may be performed.

According to the third exemplary embodiment, as in the second exemplary embodiment, an image capturing apparatus can be provided that can realize search evaluation processing having an efficient object tracking function, etc. while an increase in circuit size and costs is restrained. While the first to third exemplary embodiments describe examples in which the display frame of the object is displayed using the search evaluation processing results, the described examples are not limiting examples. The search evaluation processing results may used in auto-focusing, photometry, the selection of a processing target region in white balance processing, and the calculation of a weighting coefficient with respect to a region. Alternatively, the search evaluation processing results may be included in metadata at the time of recording image data as information indicating the region where the object is located.

(Other exemplary embodiments of the disclosure) Embodiments of the present disclosure can also be realized by execution of the following processing. Specifically, software (program) for realizing functions according to the exemplary embodiments described above is supplied to a system or apparatus via a network or various types of storage mediums, and a computer (or central processing unit (CPU), micro processing unit (MPU), etc.) of the system or apparatus reads and executes the program.

The disclosed exemplary embodiments illustrate mere examples of implementation of the disclosure, and the scope of the disclosure should not be restricted to the disclosed exemplary embodiments. Exemplary embodiments of the disclosure may be implemented in various forms without departing from the spirit or essential features of the disclosure.

While the present disclosure alas been described, with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2015-105797, filed May 25, 2015, which is hereby incorporated by reference herein in its entirety.

What is claimed is:

1. An image processing apparatus configured to identify a region comprising a predetermined object located within an image, the image processing apparatus comprising:
   a processor; and
   a memory including instructions that, when executed by the processor, cause the imaging processing apparatus to:
   read a partial image of a first image as a second image on each of a plurality of evaluation target regions set in a predetermined direction of the first image;
   perform a correlation evaluation with the image of the predetermined object on the plurality of the second images in parallel;
   determine an interval (VS) between the plurality of evaluation target regions based on a number (N) of correlation evaluations performed in parallel and a size (WV) of the plurality of evaluation target regions in the predetermined direction so that VS≥WV/N; and
   identify the region where the predetermined object is located within the first image based on a result of the correlation evaluation.

2. The image processing apparatus according to claim 1, wherein the instructions, when executed by the processor, further cause the processing device to:
   detect an object from an image of a frame preceding the first image; and
   determine the size of each of the evaluation target regions based on a size of the object.

3. The image processing apparatus according to claim 2, wherein the correlation evaluation is performed by using an image of the object.

4. The image processing apparatus according to claim 2, wherein the instructions, when executed by the processor, further cause the image processing apparatus to detect a face of the object, and
   wherein the correlation evaluation is performed by using an image of the face of the object.

5. The image processing apparatus according to claim 1, further comprising a display device configured to display the first image and also display an indication that the identified object is located in the region within the first image.

6. An image processing apparatus configured to identify a region comprising a predetermined object located within an image, the image processing apparatus comprising:
   a processor; and
   a memory including instructions that, when executed by the processor, cause the image processing apparatus to:
   read a partial image of a first image as a second image, on each of a plurality of evaluation target regions set in a predetermined direction of the first image;
   perform a correlation evaluation with the image of the predetermined object on the plurality of the second images in parallel;
   determine a size (WV) of the plurality of evaluation target regions in the predetermined direction based on a number (N) of correlation evaluations performed in parallel an interval (VS) between the plurality of evaluation target regions so that WV≤VS×N; and
   identify the region where the predetermined object is boated within the first image, based on a result of the correlation evaluation.

7. An image processing method for identifying a region comprising a predetermined object located within an image, the method comprising:
   reading a partial image of a first image as a second image, on each of a plurality of evaluation target regions set in a predetermined direction of the first image;
   performing, a correlation evaluation with the image of the predetermined object on the plurality of the second images in parallel;
   determining an interval (VS) between the plurality of evaluation target regions based on a number (N) of correlation evaluations performed in parallel and a size (WV) of the plurality of evaluation target regions in the predetermined direction so that VS≥WV/N; and
   identifying the region where the predetermined object is located within the first image, based on a result of the correlation evaluation performed by the evaluation.

8. An image processing method for identifying a region comprising a predetermined object located within an image, the method comprising:
   reading a partial image of a first image as a second image, on each of a plurality of evaluation target regions set in a predetermined direction of the first image;
   performing a correlation evaluation with the image of the predetermined object on the plurality of the second images in parallel;
   determining a size (WV) of the plurality of evaluation target regions in the predetermined direction based on a number (N) of correlation evaluations performed in parallel and an interval (VS) between the plurality of evaluation target regions so that WV≤VS×N; and
   identifying the region where the predetermined object is located within the first image, based on a result of the correlation evaluation.

* * * * *